United States Patent
Di Battista

[11] 3,896,758
[45] July 29, 1975

[54] METEOROID IMPACT POSITION LOCATOR AIR FOR MANNED SPACE STATION

[75] Inventor: John D. Di Battista, Newport News, Va.

[73] Assignee: The United States of America as represented by the United States National Aeronautics and Space Administration Office of General Counsel-Code GP, Washington, D.C.

[22] Filed: Oct. 2, 1973

[21] Appl. No.: 402,867

[52] U.S. Cl............ 116/114 AH; 73/12; 73/170 R; 73/432 PS
[51] Int. Cl........................ G01d 21/00; G01w 1/00
[58] Field of Search ... 116/114 R, 114 AH, 114 AJ; 73/432 R, 170 R, 12, 432 PS, 432 SD

[56] References Cited
UNITED STATES PATENTS

| | | | |
|---|---|---|---|
| 517,975 | 4/1894 | Dudley | 73/12 |
| 2,944,250 | 7/1960 | Outt | 73/432 R |
| 2,976,716 | 3/1961 | DeHaven | 73/150 R X |
| 3,277,724 | 10/1966 | Lundeberg | 73/432 R |
| 3,407,304 | 10/1968 | Kinard et al. | 73/12 X |
| 3,744,320 | 7/1973 | White | 73/432 R |
| 3,793,874 | 2/1974 | Shockey et al. | 73/12 |

Primary Examiner—Richard C. Queisser
Assistant Examiner—Daniel M. Yasich
Attorney, Agent, or Firm—Howard J. Osborn; John R. Manning

[57] ABSTRACT

Location of meteoroid impacts in space vehicles by coating the metallic interior wall of the space vehicle with a thin layer of a coating material having contrasting color to that of the vehicle interior wall and being capable of flaking or chipping off when an impacting meteoroid deforms said wall.

6 Claims, 4 Drawing Figures

PATENTED JUL 29 1975  3,896,758
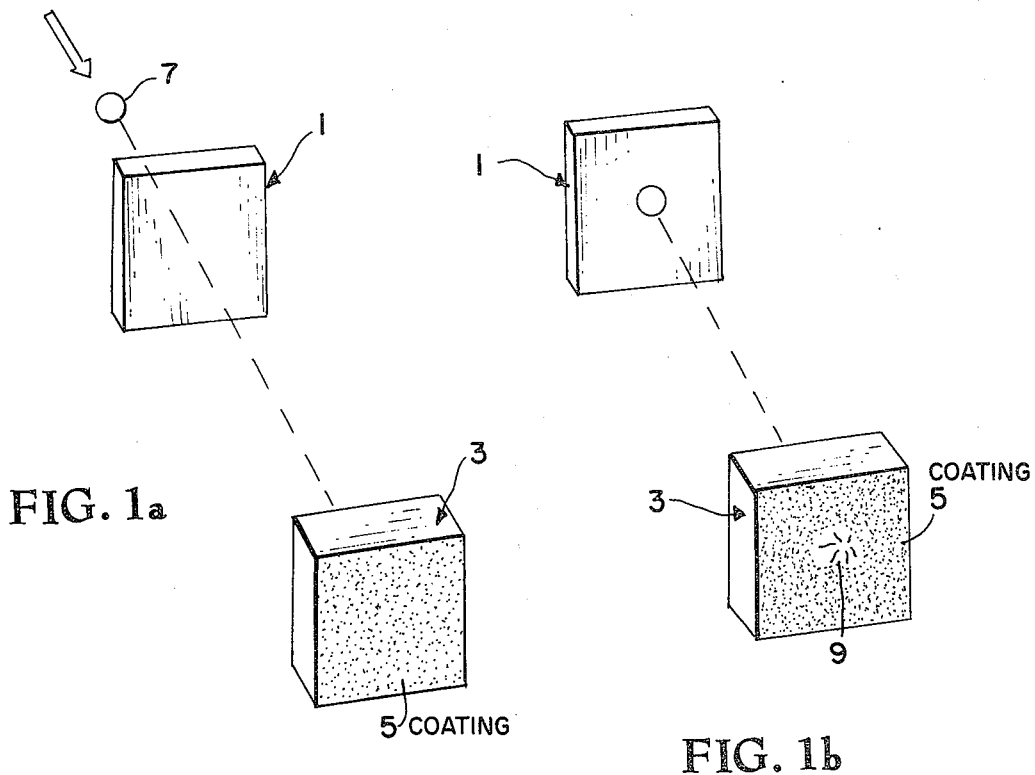
FIG. 1a
FIG. 1b
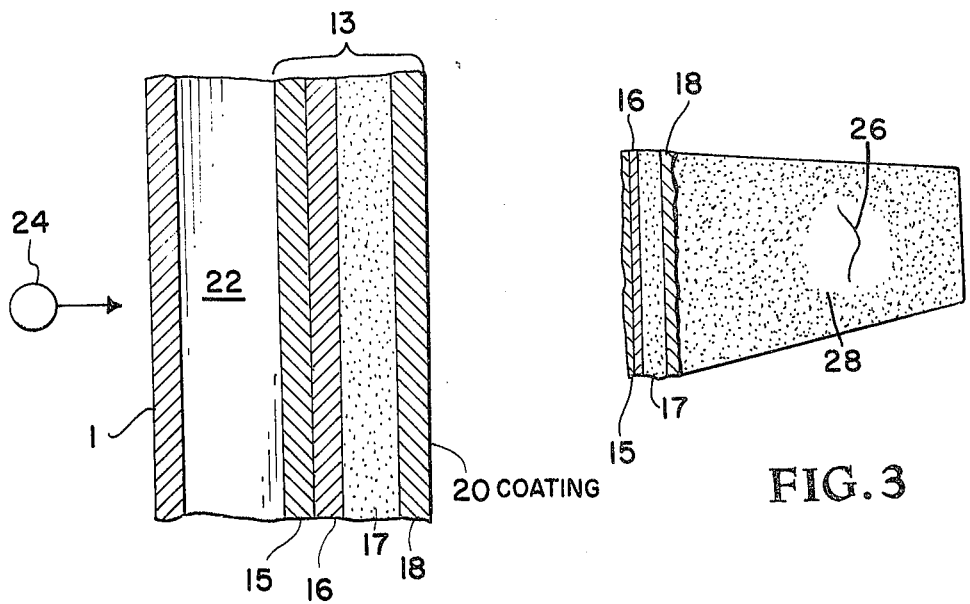
FIG. 2
FIG. 3

METEOROID IMPACT POSITION LOCATOR AIR FOR MANNED SPACE STATION

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to a method for locating meteoroid impacts in manned space vehicles.

2. Description of the Prior Art

The rapid location of the penetration and near penetration position of impacting meteoroids on manned space vehicles such as spacecrafts or manned space stations is vital to facilitate rapid repair and minimize the loss of cabin atmosphere. Heretofore, methods of detecting where a meteoroid had struck a space vehicle had depended on either a detailed visual examination of the space station main wall interior surface and outer meteoroid bumper shield surface or have involved the use of various devices such as microphones to record the noise of the impacts and inflated bags place next to the space station main wall which would deflate when penetrated by a meteoroid penetrating the main wall.

The visual examination detection methods are not totally satisfactory in that they have not been able to reveal clearly or rapidly enough the location of the meteoroid impacts. The detection methods involving the use of devices such as microphones and inflated bags, on the other hand, require electrical components and electrical power which, in addition to being weighty and cumbersome, are expensive.

SUMMARY OF THE INVENTION

One object of the invention therefore is to provide a method of facilitating the location of meteoroid impacts on manned space vehicles.

Another object of the invention is to provide a method of determining meteoroid impacts in manned space vehicles which does not involve the use of expensive, weighty and cumbersome equipment.

Yet another object of the invention is to provide a simple method for the detection of meteoroid impacts in manned space vehicles whereby the impacts are easily and rapidly detectible by the human eye.

These and other objects of the invention are obtained by a method comprising coating the interior wall of the space vehicle with a thin layer of a coating material having contrasting color to that of the vehicle interior wall and capable of flaking or chipping off when an impacting meteoroid deforms the wall.

In accordance with the present invention when any meteoroid penetrates the space station meteoroid bumper and impacts the outer surface of the space station main wall, the wall will experience deformation and the coating of contrasting color provided the shiny metal interior surface of the space vehicle wall will chip off revealing or exposing a large area of metal in the location of the impact which area during a visual examination stands out well against a contrasting background.

DESCRIPTION OF THE DRAWING

More complete appreciation of the present invention and many of the attendant advantages thereof will be more readily understood by reference to the following detailed description when considered in connection with the accompanying drawing wherein:

FIG. 1a is a schematic representation of a meteoroid bumper and coated space craft main wall before meteoroid impact;

FIG. 1b is a schematic representation of a meteoroid bumper and coated space craft main wall after meteoroid impact.

FIG. 2 is a schematic representation in cross-section of the meteoroid bumper-laminate main wall structure used in the example below, and FIG. 3 is a perspective view of the interior surface of the main wall structure of FIG. 2.

Referring now to FIG 1a and FIG. 1b, there is shown a space craft meteoroid bumper 1 of a suitable metal such as aluminum and a space craft main wall 3 likewise of a suitable metal spaced a distance from the meteoroid bumper 1. The interior wall of main wall 3 is provided with a thin layer 5 of a coating material of contrasting color to that of the interior surface of the main wall 3.

A meteoroid shown as 7 in FIG. 1a, upon striking the space vehicle penetrates meteoroid bumper 1 and impacts main wall 3 causing a deformation 9 therein which deformation in turn causes a separation or a chipping off of the coating in the area of deformation. The contrasting main wall color indicated as 5 will then be visible and the failure area can be easily located.

A specific example demonstrating the method of the invention is illustrated in the following specific example with reference to FIG. 2 and FIG. 3.

EXAMPLE

In FIG. 2 is shown a space craft meteoroid bumper 1 of aluminum plate .042 centimeters thick and spaced therefrom a laminated main wall indicated generally as 13. The laminated main wall is composed of a double outer layer of aluminum plates 15 and 16 of the same thickness as meteoroid bumper 1 and an inner aluminum plate 18 also of the same thickness as meteoroid bumper 1. Between plate 16 and plate 18 there is provided a polycarbonate plate 17 0.178 centimeters thick. The interior surfact of plate 18 which constitutes the interior wall of the space vehicle is coated with a black enamel spray paint coating 20 which paint meets U.S. Government specifications TT-L-50F. The paint thickness is 0.000254 cm. The space craft main wall 13 is separated from the meteoroid bumper 1 a distance of 0.254 cm and is shown in FIG. 2 as void 22.

To simulate meteoroid impact, an aluminum sphere 24 is fired from a light gas gun (not shown). The aluminum sphere has a mass of 35 mg. and a sphere velocity of 6.81 km/sec.

Upon impacting the space craft's outer barrier, i.e. the meteoroid bumper 1, the sphere 24 penetrates the bumper 1 and shatters. The particles proceed toward and impact the main wall 13 causing the deformation shown as 26 in FIG. 3. The deformation 26 causes the black spray enamel to separate from the wall thereby exposing the bare, shiny surface of plate 18 at the location of impact indicated as 28 in FIG. 3.

The only requirement which the coating material must meet is that is must separate from the main wall and break easily upon deformation of the wall. Thus, the coating material may be any suitable paint, paint enamel, ceramic such as procelain, and like brittle coating compositions capable of being applied in relatively thin layers and which chip or flake off when an impacting meteorite deforms the coated wall.

Similarly, the only requirement as to the thickness of the coating is that it not be so thin or conversely so thick that its separation from the interior wall is precluded upon meteorite impact. The particular thickness of the layer selected will of course vary depending upon the coating material employed, but ordinarily the thickness of the coated layer will fall in the range of 0.00254 to 0.000254 cm.

The particular metallic interior wall of the space vehicle coated in accordance with the present invention is not a critical feature of the invention. In general, the interior wall of the main wall of space vehicles is constructed of aluminum, aluminum alloys, stainless steel and stainless steel alloys.

Although the present invention may be used in connection with any space vehicles, it is principally contemplated for use on space stations because their size and length of time in orbit increase the possibility of an impact failure of the space craft main wall and because personnel are needed to visually locate where the coating has chipped off the wall.

While the invention has been described in detail with respect to certain now preferred examples and embodiments of the invention, it will be understood by those skilled in the art after understanding the invention that various changes and modification may be made without departing from the spirit and scope of the invention and it is intended, therefore, to cover all such changes and modifications in the appended claims.

What is claimed as new and desired to be secured by Letters Patent of the United States is:

1. A method of locating meteoroid impacts in manned space vehicles which comprises the steps of: providing a space vehicle; coating the interior wall of the space vehicle with a layer of coating material of a preselected thickness having contrasting color to that of the vehicle interior wall said layer being of the preselected thickness so as to be capable of flaking or chipping off when an impacting meteoroid deforms said wall subjecting the space vehicle to meteoroid impact, and observing the vehicle interior wall for flaking or chipping thereby locating the point of meteoroid impact.

2. The method of claim 1 wherein the step of coating is painting the interior wall with a paint.

3. The method of claim 2 wherein the step of coating is painting the interior wall with a black pigmented paint enamel.

4. The method of claim 1 wherein the step of coating is covering the interior wall with a ceramic coating composition such as porcelain.

5. The method of claim 1 wherein the space vehicle wall provided is constructed of a metal selected from the group consisting of: aluminum alloy, stainless steel and stainless steel alloy.

6. The method of claim 5 wherein the interior wall provided is aluminum and the step of coating is painting the interior wall with a black pigmented paint enamel.

* * * * *